United States Patent
Axelson et al.

(10) Patent No.: US 12,023,987 B2
(45) Date of Patent: Jul. 2, 2024

(54) SYSTEM, A METHOD AND A COMPUTER PROGRAM PRODUCT FOR CONTROLLING THE TEMPERATURE OF A TEMPERATURE CONTROLLED VEHICLE COMPARTMENT

(71) Applicant: Ningbo Geely Automobile Research & Development Co., Ltd., Ningbo (CN)

(72) Inventors: Gustaf Axelson, Västra Frölunda (SE); Jonathan Johansson, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 0 days.

(21) Appl. No.: 17/745,575

(22) Filed: May 16, 2022

(65) Prior Publication Data

US 2022/0274461 A1 Sep. 1, 2022

Related U.S. Application Data

(63) Continuation of application No. PCT/CN2020/129780, filed on Nov. 18, 2020.

(30) Foreign Application Priority Data

Nov. 20, 2019 (EP) ..................... 19210384

(51) Int. Cl.
*B60H 1/00* (2006.01)
*B60N 3/10* (2006.01)

(52) U.S. Cl.
CPC ..... *B60H 1/00807* (2013.01); *B60H 1/00771* (2013.01); *B60N 3/104* (2013.01)

(58) Field of Classification Search
CPC ............ B60H 1/00807; B60H 1/00771; B60H 1/0025; B60H 1/00657; B60N 3/104; F25D 2700/06; F25D 2700/08; F25D 2700/16; G06V 20/56
See application file for complete search history.

(56) References Cited

U.S. PATENT DOCUMENTS

| 6,997,004 B1 | 2/2006 | Pittman |
| 2011/0193710 A1 | 8/2011 | McIlvain et al. |
| 2016/0023585 A1 | 1/2016 | Salter et al. |

(Continued)

FOREIGN PATENT DOCUMENTS

| CN | 107972997 A | 5/2018 |
| EP | 2759990 A1 | 7/2014 |

(Continued)

OTHER PUBLICATIONS

International Search Report from corresponding International Application No. PCT/CN2020/129780, dated Feb. 22, 2021, 2 pages.

*Primary Examiner* — Emmanuel E Duke
(74) *Attorney, Agent, or Firm* — Tucker Ellis LLP

(57) ABSTRACT

A system in a vehicle configured to control the temperature of a temperature controlled vehicle compartment. The system includes: a temperature controlled vehicle compartment configured to be cooled and/or heated; and a processing circuitry operatively connected to the temperature controlled vehicle compartment configured to cause the system to: detect at least a first attribute of at least a first object within a predetermined distance from the vehicle, activate any of cooling or heating of the temperature controlled vehicle compartment based on the at least first attribute of the at least first object.

15 Claims, 3 Drawing Sheets

(56) References Cited

U.S. PATENT DOCUMENTS

| | | | |
|---|---|---|---|
| 2018/0174262 A1 | 6/2018 | Wilkinson et al. | |
| 2018/0224150 A1 | 8/2018 | Lewis et al. | |
| 2019/0041860 A1* | 2/2019 | Jones | ................... B60L 1/003 |

FOREIGN PATENT DOCUMENTS

| | | | | |
|---|---|---|---|---|
| JP | 2003106751 A | 4/2003 | | |
| JP | 2008260388 A | 10/2008 | | |
| JP | 2019156216 A | 9/2019 | | |
| WO | 2007089789 A2 | 8/2007 | | |
| WO | WO-2016182962 A1 * | 11/2016 | ......... | B60H 1/00742 |
| WO | 2017161123 A1 | 9/2017 | | |
| WO | 2018075157 A1 | 4/2018 | | |
| WO | 2019163434 A1 | 8/2019 | | |

* cited by examiner

SYSTEM, A METHOD AND A COMPUTER PROGRAM PRODUCT FOR CONTROLLING THE TEMPERATURE OF A TEMPERATURE CONTROLLED VEHICLE COMPARTMENT

RELATED APPLICATION DATA

This application is a continuation of International Patent Application No. PCT/CN2020/129780, filed Nov. 18, 2020, which claims the benefit of European Patent Application No. 19210384.4, filed Nov. 20, 2019, the disclosures of which are incorporated herein by reference in their entireties.

TECHNICAL FIELD

The present disclosure relates to a system in a vehicle configured to control the temperature of a temperature controlled vehicle compartment and a method for controlling the temperature of the temperature controlled vehicle compartment.

BACKGROUND

Vehicles today are often used for transporting of goods such as groceries and other objects. There are special designed transport vehicles equipped with a cool compartment that is kept cool for transportation of cold goods. There are also special designed transport vehicles equipped with a warm compartment that is kept warm for transporting warm goods. Vehicles for private usage are however often used for transporting all kinds of goods independent of the temperature. It is not always desired to keep a certain compartment in a vehicle at a certain temperature. However, sometimes it may be desired to keep a certain grocery or object at a certain temperature. For example, when transporting warm food from a restaurant to the home, it is desired not to cool down the food but to maintain the temperature of the warm food. The same applies to cold objects, such as when transporting frozen groceries from the grocery store, it is desired to keep the groceries cold on the way home. It is quite common to use e.g. temperature isolated containers inside of vehicles to maintain the temperature of an object. Vehicles transporting warm food may be equipped with temperature-isolated compartments, configured to isolate the warm food from being cooled by the surrounding temperature. There are also refrigerators in vehicles configured to keep objects cold inside of the refrigerator.

SUMMARY

Maintaining a compartment in the vehicle at a certain temperature consumes energy. Both cooling a compartment and heating a compartment at all time have an impact of the overall energy consumption of the vehicle. It is therefore not always desired to keep a certain compartment at a certain temperature at all times. However, at certain occasions it is desired to keep a certain compartment at a certain temperature in order to maintain the temperature of goods to be transported. In order to keep energy consumption down and to prepare the vehicle to transport a certain object to be maintained at a certain temperature, a compartment has to be prepared before, or activated when, the object is placed in the vehicle. This may be cumbersome and not always easy to do, and may involve manual actions that has to be taken by a vehicle occupant, and can hence be forgotten. It can also result in that the vehicle compartment is prepared in a wrong way, e.g. that a compartment is heated instead of cooled down, and that the energy consumption is not kept low.

It is an object of the present disclosure to mitigate, alleviate or eliminate one or more of the above-identified deficiencies and disadvantages in the prior art and solve at least the above mentioned problem.

According to a first aspect there is provided a system in a vehicle configured to control the temperature of a temperature controlled vehicle compartment, the system comprising: a temperature controlled vehicle compartment configured to be cooled and/or heated; and a processing circuitry operatively connected to the temperature controlled vehicle compartment, configured to cause the system to: detect at least a first attribute of at least a first object within a predetermined distance from the vehicle, activate any of cooling or heating of the temperature controlled vehicle compartment based on the at least first attribute of the at least first object.

This aspect has an advantage that cooling or heating of the temperature controlled vehicle compartment can be activated dependent on an attribute of an object that is within a predetermined distance from the vehicle, and else not activated in order to lower the energy consumption of the vehicle. Another advantage is that e.g. a vehicle occupant does not need to remember to activate the heating or the cooling of the temperature controlled vehicle compartment.

According to some embodiments, the system further comprises at least a first camera operatively connected to the processing circuitry configured to obtain images, and the processing circuitry is further configured to, cause the system to: obtain, by the at least first camera, at least a first image data of the interior of the temperature controlled vehicle compartment and/or the surroundings of the vehicle; detect at least a first attribute of at least a first object in the at least first image data by object recognition processing of the at least first image data; and determine if cooling or heating of the temperature controlled vehicle compartment is to be activated based on the at least first attribute of the at least first object.

An advantage with the mentioned embodiments is that the camera can be used to identify the object inside the temperature controlled vehicle compartment or outside of the vehicle, and automatically determine if the temperature controlled vehicle compartment is to be cooled or heated dependent on an attribute of the object as such.

According to some embodiments, the system further comprises a position sensor operatively connected to the processing circuitry configured to determine the geographical location of the vehicle, and the processing circuitry is further configured to, cause the system to: obtain, by the position sensor, a location data associated with the geographical location of the vehicle; and determine, based on the location data and based on predetermined location information data that the vehicle is within a predetermined distance from a geographical location that is associated with at least a first object with at least a first attribute.

An advantage with the mentioned embodiments is that the position sensor can be used to identify the geographical location of the vehicle, and the system can determine if the temperature controlled vehicle compartment is to be cooled or heated dependent on the geographical location of the vehicle in relation to the object.

According to some embodiments, the processing circuitry is further configured to cause the system to determine when cooling or heating of the temperature controlled vehicle compartment is to be activated based on the at least first attribute of the at least first object and in a determination that the at least first attribute of the at least first object is associated with a first temperature interval, activate cooling of the temperature controlled vehicle compartment; and in a determination that the at least first attribute of the at least first object is associated with a second temperature interval, activate heating of the temperature controlled vehicle compartment.

An advantage with the mentioned embodiments is that an attribute of the object itself is used for determining if the temperature controlled vehicle compartment is to be heated or cooled.

According to some embodiments, the system further comprises a communication module operatively connected to the processing circuitry configured to communicate wirelessly via a communication network, and the processing circuitry is further configured to, cause the system to: send a temperature control data request message, indicative of a request to activate any of a cooling or a heating of the temperature controlled vehicle compartment, to be received at an electronic device; and receive a temperature control data response message, indicative of a response to activate any of a cooling or a heating of the temperature controlled vehicle compartment, from the electronic device.

An advantage with the mentioned embodiments is that e.g. a vehicle occupant that is away from the vehicle can get notified about a request to start heating or cooling of the temperature controlled vehicle compartment, and the vehicle occupant can then remotely acknowledge to start heating or cooling of the temperature controlled vehicle compartment from the electronic device.

According to some embodiments, the system further comprises a communication module operatively connected to the processing circuitry configured to communicate wirelessly via a communication network, and the processing circuitry is further configured to, cause the system to determine the presence of an electronic device associated with the system within a predetermined distance from the vehicle, wherein the electronic device is configured to detect least a first attribute of at least a first object within a predetermined distance from the vehicle; and receive, from the electronic device, a temperature control data message, indicative of an instruction to activate any of a cooling or a heating of the temperature controlled vehicle compartment.

An advantage with the mentioned embodiments is that the system can get notified of a temperature control data message, that is generated by an electronic device associated with the system within a predetermined distance from the vehicle, e.g. in the possession of a vehicle occupant that is away from the vehicle, in order to activate cooling or a heating of the temperature controlled vehicle compartment dependent on the temperature control data message.

According to some embodiments, the system further comprises at least a first temperature sensor operatively connected to the processing circuitry configured to obtain temperature data, and the processing circuitry is further configured to cause the system to obtain, by the at least first temperature sensor, a first temperature data of the temperature controlled vehicle compartment while the temperature controlled vehicle compartment remains closed; obtain, by the at least first temperature sensor, a second temperature data of the temperature controlled vehicle compartment at a predefined time after the temperature controlled vehicle compartment has been opened and closed; and determine a change in temperature of the temperature controlled vehicle compartment based on a temperature difference between the first temperature data and the second temperature data; and in a determination that the temperature of the temperature controlled vehicle compartment is decreasing, activate cooling of the temperature controlled vehicle compartment; and; in a determination that the temperature of the temperature controlled vehicle compartment is increasing, activate heating of the temperature controlled vehicle compartment.

An advantage with the mentioned embodiments is that the temperature controlled vehicle compartment can be cooled or heated dependent on the temperature change after an object has been placed in the temperature controlled vehicle compartment.

According to some embodiments, the system further comprises an external temperature sensor operatively connected to the processing circuitry configured to obtain temperature data of the exterior temperature outside of the temperature controlled vehicle compartment, and the processing circuitry is further configured to cause the system to obtain, by the external temperature sensor, a third temperature data of the exterior temperature outside of the temperature controlled vehicle compartment; determine a change in temperature of the temperature controlled vehicle compartment based on the temperature difference between the first temperature data and the second temperature data; and in a determination that the temperature of the temperature controlled vehicle compartment is decreasing after a predetermined time, wherein the predetermined time is dependent on the difference between the first temperature data and the third temperature data, activate cooling of the temperature controlled vehicle compartment; and in a determination that the temperature of the temperature controlled vehicle compartment is increasing after a predetermined time, wherein the predetermined time is dependent on the difference between the first temperature data and the third temperature data, activate heating of the temperature controlled vehicle compartment.

An advantage with the mentioned embodiments is that the temperature controlled vehicle compartment can be cooled or heated further dependent on the surrounding temperature, in which the temperature controlled vehicle compartment has been opened and closed, and on the temperature change after an object has been placed in the temperature controlled vehicle compartment.

According to some embodiments, wherein the at least first object is any of: a food product; a trademark; a package; a container; a grocery store; a shape; a restaurant; a shop; a grocery bag; a cooling box; a food box or a perishable food product.

An advantage with the mentioned embodiments is that the object can be of different types since it is the at least first attribute of the object that is used for activating any of cooling or heating of the temperature controlled vehicle compartment.

According to a second aspect there is provided a method for controlling the temperature of a temperature controlled vehicle compartment based on detection of at least a first attribute of at least a first object within a predetermined distance from the vehicle, the method comprising: detecting at least a first attribute of at least a first object within a predetermined distance from the vehicle; and activate any of cooling or heating of the temperature controlled vehicle compartment based on the at least first attribute of the at least first object.

This aspect has an advantage that cooling or heating of the temperature controlled vehicle compartment can be activated dependent on an attribute of an object that is within a distance from the vehicle, and else not activated in order to lower the energy consumption of the vehicle. Another advantage is that e.g. a vehicle occupant does not need to remember to activate the heating or the cooling of the temperature controlled vehicle compartment.

According to some embodiments, the method further comprises: obtaining, by at least a first camera, at least a first image data of the interior of the temperature controlled vehicle compartment and/or the surroundings of the vehicle; detecting at least a first attribute of at least a first object in the at least first image data by object recognition processing of the at least first image data; and determining if cooling or heating of the temperature controlled vehicle compartment is to be activated based on the at least first attribute of the at least first object.

An advantage with the mentioned embodiments is that the camera can be used to identify the object inside the temperature controlled vehicle compartment or outside of the vehicle, and automatically determine if the temperature controlled vehicle compartment is to be cooled or heated dependent on an attribute of the object as such.

According to some embodiments, the method further comprises: obtaining, by a position sensor, a location data associated with the geographical location of the vehicle; and determining, based on the location data and based on predetermined location information data, that the vehicle is within a predetermined distance from a geographical location that is associated with at least a first object with at least a first attribute.

An advantage with the mentioned embodiments is that the position sensor can be used to identify the geographical location of the vehicle, and the system can determine if the temperature controlled vehicle compartment is to be cooled or heated dependent on the geographical location of the vehicle in relation to the object.

According to some embodiments, in a determination that the at least first attribute of the at least first object is associated with a first temperature interval, activate cooling of the temperature controlled vehicle compartment; and in a determination that the at least first attribute of the at least first object is associated with a second temperature interval, activate heating of the temperature controlled vehicle compartment.

An advantage with the mentioned embodiments is that an attribute of the object itself is used for determining if the temperature controlled vehicle compartment is to be heated or cooled.

According to some embodiments, the method further comprises: sending a temperature control data request message, indicative of a request to activate any of a cooling or a heating of the temperature controlled vehicle compartment, to be received at an electronic device; and receive a temperature control data response message, indicative of a response to activate any of a cooling or a heating of the temperature controlled vehicle compartment, from the electronic device.

An advantage with the mentioned embodiments is that e.g. a vehicle occupant that is away from the vehicle can get notified about a request to start heating or cooling of the temperature controlled vehicle compartment, and the vehicle occupant can then remotely acknowledge to start heating or cooling of the temperature controlled vehicle compartment from the electronic device.

According to some embodiments, the method further comprises: obtaining, by at least a first temperature sensor, a first temperature data of the temperature controlled vehicle compartment while the temperature controlled vehicle compartment remains closed; obtaining, by the at least first temperature sensor, a second temperature data of the temperature controlled vehicle compartment at a predefined time after the temperature controlled vehicle compartment has been opened and closed; and determining a change in temperature of the temperature controlled vehicle compartment based on a temperature difference between the first temperature data and the second temperature data; and in a determination that the temperature of the temperature controlled vehicle compartment is decreasing, activate cooling of the temperature controlled vehicle compartment; and; in a determination that the temperature of the temperature controlled vehicle compartment is increasing, activate heating of the temperature controlled vehicle compartment.

An advantage with the mentioned embodiments is that the temperature controlled vehicle compartment can be cooled or heated dependent on the temperature change after an object has been placed in the temperature controlled vehicle compartment.

According to some embodiments, the at least first object is any of: a food product; a trademark; a package; a container; a grocery store; a shape; a restaurant; a shop; a grocery bag; a cooling box; a food box or a perishable food product.

An advantage with the mentioned embodiments is that the object can be of different types since it is the at least first attribute of the object that is used for activating any of cooling or heating of the temperature controlled vehicle compartment.

According to a third aspect there is provided a computer program product comprising a non-transitory computer readable medium, having thereon a computer program comprising program instructions, the computer program being loadable into a processing circuitry and configured to cause execution of the method when the computer program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Maintaining a compartment in the vehicle at a certain temperature consumes energy. Both cooling a compartment and heating a compartment at all time have an impact of the overall energy consumption of the vehicle. It is therefore not always desired to keep a certain compartment at a certain temperature at all times. However, at certain occasions it is desired to keep a certain compartment at a certain temperature in order to maintain the temperature of goods to be transported. In order to keep energy consumption down and to prepare the vehicle to transport a certain object to be maintained at a certain temperature, a compartment has to be prepared before, or activated when, the object is placed in the vehicle. This may be cumbersome and not always easy to do, and may involve manual actions that has to be taken by a vehicle occupant, and can hence be forgotten. It can also result in that the vehicle compartment is prepared in a wrong way, e.g. that a compartment is heated instead of cooled down, and that the energy consumption is not kept low.

It is an object of the present disclosure to mitigate, alleviate or eliminate one or more of the above-identified deficiencies and disadvantages in the prior art and solve at least the above mentioned problem.

Figure 1:
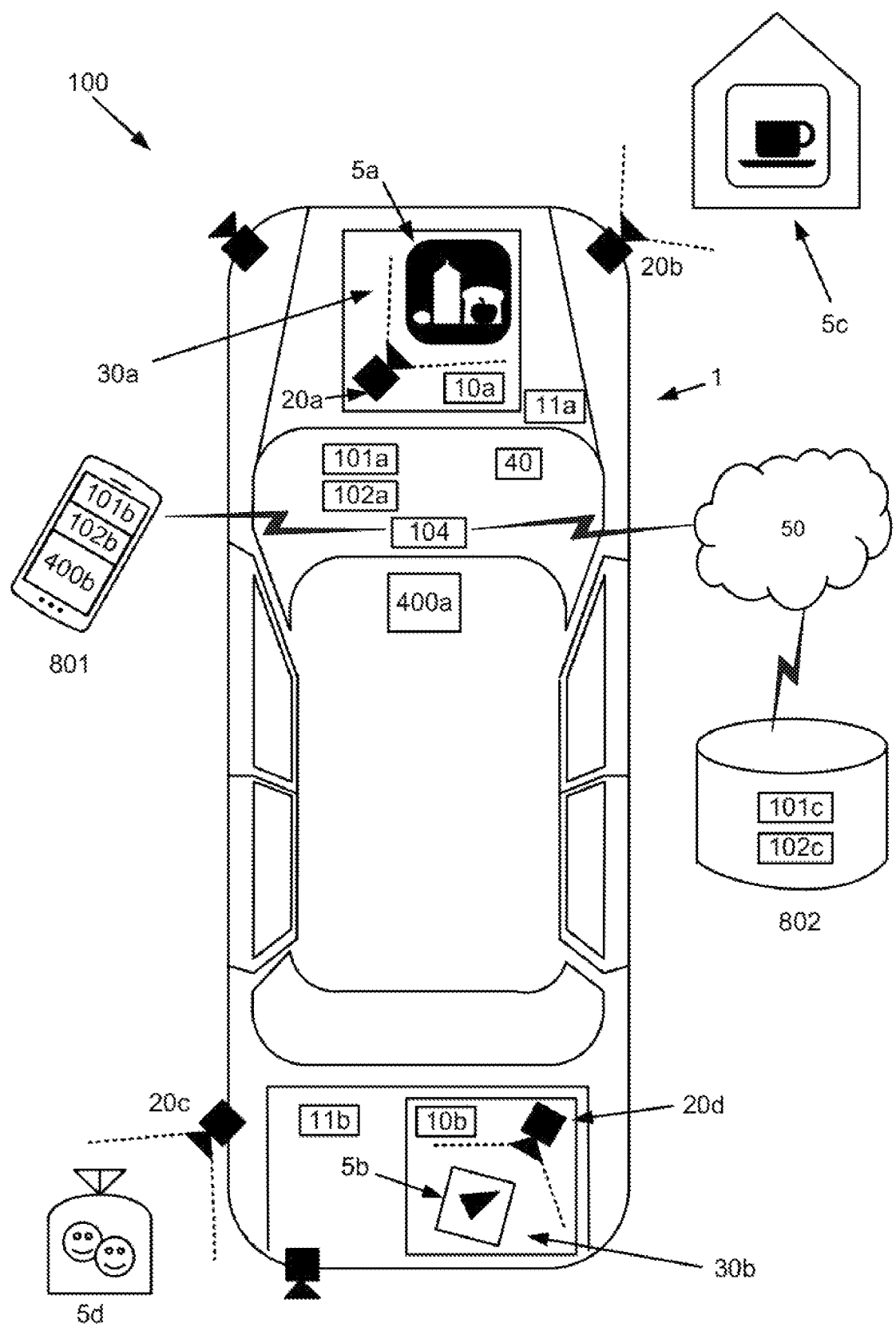
FIG. 1 illustrates an overview of the system according to some embodiments.

FIG. 1 illustrates an overview of the system according to some embodiments. The first aspect of this disclosure shows a system 100 in a vehicle 1 configured to control the temperature of a temperature controlled vehicle compartment 30a, 30b. The system 100 comprising: a temperature controlled vehicle compartment 30a, 30b configured to be cooled and/or heated. In FIG. 1 the temperature controlled vehicle compartment 30a, 30b is illustrated as a part of a trunk, a storage compartment located at the rear of the vehicle 1, and/or as a part of a so called frunk, a storage compartment located at the front of the vehicle 1. According to some embodiments, the temperature controlled vehicle compartment 30a, 30b is the trunk and/or the frunk compartment itself.

The system 100 comprising a processing circuitry 102a, 102b, 102c operatively connected to the temperature controlled vehicle compartment 30a, 30b. According to some embodiments the processing circuitry 102a is the processing circuitry of an on-board vehicle computer. According to some embodiments the processing circuitry 102b, 102c is comprised in an electronic device 801, 802 connected to the system 100 via a wireless communication network 50, as illustrated in FIG. 1.

According to some embodiments the vehicle control system 100 further comprises a memory 101a, 101b, 101c configured to store data. According to some embodiments the memory 101a is the memory of an on-board vehicle computer. According to some embodiments the memory 101b, 101c is comprised in an electronic device 801, 802 connected to the system 100 via a wireless communication network 50, as illustrated in FIG. 1.

In one example the wireless communication network 50, as illustrated in FIG. 1 is a standardized wireless local area network such as a Wireless Local Area Network, WLAN, Bluetooth™, ZigBee, Ultra-Wideband, Radio Frequency Identification, RFID, or similar network. In one example the wireless communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some embodiments wireless communication network 50 can also be a combination of both a local area network and a wide area network. According to some embodiments the wireless communication network 50 is defined by common Internet Protocols.

The processing circuitry 102a, 102b, 102c is configured to cause the system 100 to: detect at least a first attribute of at least a first object 5a, 5b, 5c, 5d within a predetermined distance from the vehicle 1, activate any of cooling or heating of the temperature controlled vehicle compartment 30a, 30b based on the at least first attribute of the at least first object 5a, 5b, 5c, 5d.

This aspect has an advantage that cooling or heating of the temperature controlled vehicle compartment can be activated dependent on an attribute of an object that is within a distance from the vehicle, and else not activated in order to lower the energy consumption of the vehicle. Another advantage is that e.g. a vehicle occupant does not need to remember to activate the heating or the cooling of the temperature controlled vehicle compartment.

According to an aspect a plurality of temperature controlled vehicle compartments are arranged together to enable both cooling and heating of objects 5a, 5b, 5c, 5d wherein at least one temperature controlled vehicle compartment is used for cooling and at least one temperature controlled vehicle compartment is used for heating of objects 5a, 5b, 5c, 5d.

According to some embodiments the temperature controlled vehicle compartment 30a, 30b is a closed compartment arranged with a covering element configured to be in an open position for receiving an object 5a, 5b, 5c, 5d, and configured to be in a closed position for maintaining the temperature of the object 5a, 5b, 5c, 5d in the temperature controlled vehicle compartment. In an example the temperature controlled vehicle compartment 30a, 30b is equipped with a lid or a door that can be opened for loading or offloading an object 5a, 5b, 5c, 5d, and in a closed position for maintaining the temperature of the object 5a, 5b, 5c, 5d.

According to some embodiments the system 100 further comprises at least a first camera 20a, 20b, 20c, 20d operatively connected to the processing circuitry 102a, 102b, 102c configured to obtain images. According to some embodiments the at least first camera 20a, 20b, 20c, 20d is mounted on the outside or on the inside of the vehicle 1. According to some embodiments the at least first camera 20a, 20b, 20c, 20d is integrated into the body of the vehicle 1. According to some embodiments the at least first camera 20a, 20b, 20c, 20d is configured to obtain image data im1, im2, im3 of the interior of the temperature controlled vehicle compartment 30a, 30b and/or obtain image data im1, im2, im3 of the surroundings of the vehicle 1. According to some embodiments the at least first camera 20a, 20b, 20c, 20d provides a wide angle view of the surroundings outside of the vehicle 1 provided by a wide angle lens of the at least first camera 20a, 20b, 20c, 20d. According to some embodiments the at least first camera 20a, 20b, 20c, 20d is configured to provide a telephoto view of the surroundings outside of the vehicle 1 provided by a telephoto lens of the at least first camera 20a, 20b, 20c, 20d. According to some embodiments the system 100 comprises a combination of different cameras 20a, 20b, 20c, 20d for providing both a wide angle view and a telephoto view of the surroundings outside of the vehicle 1. In the example as illustrated in FIG. 1, the camera 20b is configured to obtain image data of a coffee shop 5c that is in the surroundings of the vehicle 1. In the example as illustrated in FIG. 1, the camera 20c is configured to obtain image data of a shopping bag 5d that is in the surroundings of the vehicle 1.

According to some embodiments the system 100 further comprises at least first camera 20a, 20b, 20c, 20d configured to obtain at least a first image data im1, im2, im3 of the interior of the temperature controlled vehicle compartment 30a, 30b inside of the vehicle 1. According to some embodiments the at least first camera 20a, 20b, 20c, 20d is a micro photography camera configured to provide a micro view of the interior of the temperature controlled vehicle compartment 30a, 30b. In the example as illustrated in FIG. 1, the camera 20a is configured to obtain image data of a grocery bag 5a that is inside of the temperature controlled vehicle compartment 30a of the vehicle 1. In the example as illustrated in FIG. 1, the camera 20d is configured to obtain image data of a pizza box 5b that is inside of the temperature controlled vehicle compartment 30b of the vehicle 1.

According to some embodiments the at least first camera 20a, 20b, 20c, 20d is a thermographic camera configured to detect a temperature in the obtained at least first image data im1, im2, im3. According to some embodiments the at least first camera 20a, 20b, 20c, 20d is any of an infrared camera or a thermal imaging camera configured to detect infrared radiation. According to some embodiments the at least first camera 20a, 20b, 20c, 20d is configured to determine the temperature of at least a first object 5a, 5b, 5c, 5d in the obtained at least first image data im1, im2, im3.

According to some embodiments the processing circuitry 102a, 102b, 102c is further configured to, cause the system 100 to: obtain, by the at least first camera 20a, 20b, 20c, 20d, at least a first image data im1, im2, im3 of the interior of the temperature controlled vehicle compartment 30a, 30b and/or the surroundings of the vehicle 1; detect at least a first attribute of at least a first object 5a, 5b, 5c, 5d in the at least first image data im1, im2, im3 by object recognition processing of the at least first image data im1, im2, im3; and determine if cooling or heating of the temperature controlled vehicle compartment 30a, 30b is to be activated based on the at least first attribute of the at least first object 5a, 5b, 5c, 5d.

According to some embodiments the at least first attribute of at least a first object 5a, 5b, 5c, 5d is associated with a temperature of the at least first object 5a, 5b, 5c, 5d. According to some embodiments the at least first attribute of the at least first object 5a, 5b, 5c, 5d in the at least first image data im1, im2, im3 is detected by object recognition processing of the at least first image data im1, im2, im3.

According to some embodiments the object recognition of the at least first object 5a, 5b, 5c, 5d is used for determining a temperature associated with the at least first object 5a, 5b, 5c, 5d. In an example, the object is a frozen chicken, and example attributes is at least any of: the shape of a frozen chicken; a brand of a frozen chicken company; an con e.g. a snow flake; a product identification text; a bar code with information about the object etc. In the example, it is determined that at least a first object 5a, 5b, 5c, 5d is a frozen chicken out from the attributes of the frozen chicken, and it is determined to activate cooling of the temperature controlled vehicle compartment 30a, 30b.

According to some embodiments the system is configured to detect at least a first attribute of at least a first object 5a, 5b, 5c, 5d within a predetermined distance from the vehicle 1, wherein the predetermined distance from the vehicle 1 is defined by the view finder of the at least first camera 20a, 20b, 20c, 20d. In an example the at least first camera 20a, 20b, 20c, 20 is configured to detect at least a first attribute of at least a first object 5a, 5b, 5c, 5d that is approaching the vehicle 1. In an example, when a vehicle occupant that has been shopping at a grocery store and is on the way back to the vehicle 1 is carrying a shopping bag, the at least first camera 20a, 20b, 20c, 20 is configured to detect at least a first attribute the shopping bag, e.g. a brand of a grocery store. In another example, when a vehicle occupant that has picked up a pizza and is on the way back to the vehicle 1 and is carrying a pizza box, the at least first camera 20a, 20b, 20c, 20 is configured to detect at least a first attribute the pizza box, e.g. the shape of a pizza box.

In an example, a vehicle occupant is approaching the vehicle 1 carrying a grocery bag, and the at least first camera 20a, 20b, 20c, 20d is a thermographic camera configured to detect a temperature in the obtained at least first image data im1, im2, im3 of the grocery bag. In the example an average temperature of the grocery bag is determined that can be used together with any other attribute of the grocery bag for determining if cooling or heating of the temperature controlled vehicle compartment 30a, 30b is to be activated.

An advantage with the mentioned embodiments is that the camera can be used to identify the object inside the temperature controlled vehicle compartment or outside of the vehicle, and automatically determine if the temperature controlled vehicle compartment is to be cooled or heated dependent on an attribute of the object as such.

According to some embodiments the system 100 further comprises a position sensor 40. According to some embodiments the position sensor 40 is a Global Positioning System sensor configured to determine the geographical location. According to some embodiments the position sensor 40 is position sensor configured communicate with wireless local area networks in order to determine the geographical location.

According to some embodiments position sensor 40 is operatively connected to the processing circuitry 102a, 102b, 102c and configured to determine the geographical location of the vehicle 1, and the processing circuitry 102a, 102b, 102c is further configured to, cause the system 100 to: obtain, by the position sensor 40, a location data associated with the geographical location of the vehicle 1; and determine, based on the location data and based on predetermined location information data that the vehicle 1 is within a predetermined distance from a geographical location that is associated with at least a first object 5a, 5b, 5c, 5d with at least a first attribute. According to some embodiments the predetermined location information data comprising information about where at least a first object 5a, 5b, 5c, 5d with at least a first attribute can be found. In an example it can be determined that the vehicle 1 is parked outside a take away food restaurant that is associated with a plurality of warm objects 5a, 5b, 5c, 5d. In an example it can be determined that the vehicle 1 is parked outside grocery store that is associated with a plurality of cold objects 5a, 5b, 5c, 5d.

An advantage with the mentioned embodiments is that the position sensor can be used to identify the geographical location of the vehicle, and the system can determine if the temperature controlled vehicle compartment is to be cooled or heated dependent on the geographical location of the vehicle in relation to the object.

According to some embodiments the processing circuitry 102a, 102b, 102c is further configured to cause the system 100 to determine if cooling or heating of the temperature controlled vehicle compartment 30a, 30b is to be activated based on the geographical location of the vehicle 1 and previously stored historical data of activation of cooling and/or heating of the temperature controlled vehicle compartment 30a, 30b at the current geographical location of the vehicle 1. In an example a vehicle occupant frequently visits a certain grocery store at a certain location, and every time when visiting the certain grocery store at the certain location the system 100 has activated cooling of the temperature controlled vehicle compartment 30a, 30b.

According to some embodiments the processing circuitry 102a, 102b, 102c is further configured to cause the system 100 to determine when cooling or heating of the temperature controlled vehicle compartment 30a, 30b is to be activated based on the at least first attribute of the at least first object 5a, 5b, 5c, 5d and in a determination that the at least first attribute of the at least first object 5a, 5b, 5c, 5d is associated with a first temperature interval Tint1, activate cooling of the temperature controlled vehicle compartment 30a, 30b; and in a determination that the at least first attribute of the at least first object 5a, 5b, 5c, 5d is associated with a second temperature interval Tint2, activate heating of the temperature controlled vehicle compartment 30a, 30b.

Figure 2A:
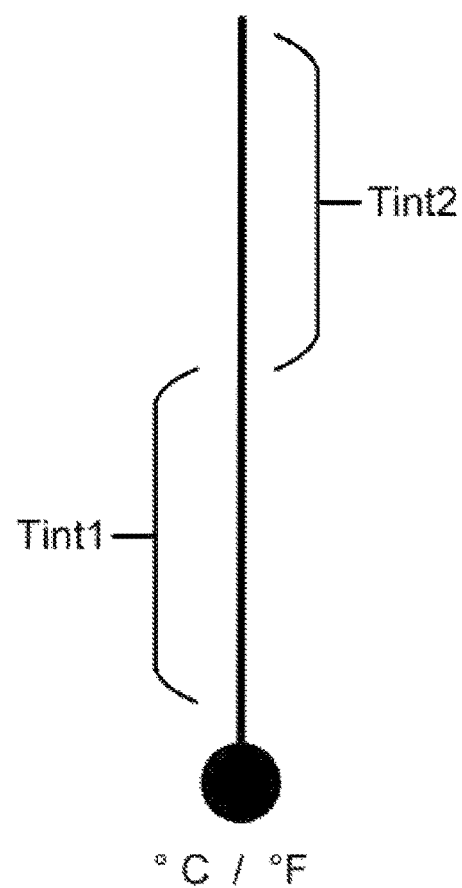
FIG. 2A illustrates a first temperature interval and a second temperature interval according to some embodiments.

FIG. 2A illustrates a first temperature interval Tint1 and a second temperature interval Tint2 according to some embodiments. According to some embodiments cooling of the temperature controlled vehicle compartment 30a, 30b is maintained until the temperature of the temperature controlled vehicle compartment 30a, 30b is below a predefined temperature. According to some embodiments heating of the temperature controlled vehicle compartment 30a, 30b is maintained until the temperature of the temperature controlled vehicle compartment 30a, 30b is above a predefined temperature.

According to some embodiments the temperature of the temperature controlled vehicle compartment 30a, 30b is determined by the at least first attribute of the at least first object 5a, 5b, 5c, 5d.

An advantage with the mentioned embodiments is that an attribute of the object itself is used for determining if the temperature controlled vehicle compartment is to be heated or cooled.

According to some embodiments the system 100 further comprises a communication module 104 operatively connected to the processing circuitry 102a, 102b, 102c configured to communicate wirelessly via a communication network 50, and the processing circuitry 102a, 102b, 102c is further configured to, cause the system 100 to: send a temperature control data request message, indicative of a request to activate any of a cooling or a heating of the temperature controlled vehicle compartment 30a, 30b, to be received at an electronic device 801, 802; and receive a temperature control data response message, indicative of a response to activate any of a cooling or a heating of the temperature controlled vehicle compartment 30a, 30b, from the electronic device 801, 802.

In an example, the system can determine that the vehicle 1 is within a predetermined distance from a geographical location that is associated with at least a first object 5a, 5b, 5c, 5d with at least a first attribute, e.g. a grocery store. In the example, the system 100 can prepare cooling or heating of the temperature controlled vehicle compartment 30a, 30b after receiving the temperature control data response message, indicative of a response to activate any of a cooling or a heating of the temperature controlled vehicle compartment 30a, 30b, from the electronic device 801, 802. In an example a vehicle occupant has left the vehicle 1 to go shopping at the grocery store. While shopping at the grocery store the vehicle occupant receives a temperature control data request message from the system 100 at the electronic device 801 in form of a smart phone, indicative of a request to activate cooling of the temperature controlled vehicle compartment 30a, 30b. The vehicle occupant acknowledges the request and approves activation of cooling of the temperature controlled vehicle compartment 30a, 30b by e.g. an input via a user interface 400b of the smart phone. In an example the vehicle occupant has parked the vehicle 1 near the grocery store. While remaining in the vehicle 1, the vehicle occupant receives a temperature control data request message from the system 100 via a user interface 400a of the vehicle 1, indicative of a request to activate cooling of the temperature controlled vehicle compartment 30a, 30b. The vehicle occupant acknowledges the request and approves activation of cooling of the temperature controlled vehicle compartment 30a, 30b by e.g. an input via the user interface 400a of the vehicle 1 before leaving the vehicle to go shopping at the grocery store.

An advantage with the mentioned embodiments is that e.g. a vehicle occupant that is away from the vehicle 1 can get notified about a request to start heating or cooling of the temperature controlled vehicle compartment 30a, 30b, and the vehicle occupant can then remotely acknowledge to start heating or cooling of the temperature controlled vehicle compartment 30a, 30b from the electronic device 801, 802.

According to some embodiments, the processing circuitry is further configured to, cause the system to determine the presence of an electronic device 801, 802 associated with the system 100 within a predetermined distance from the vehicle 1, wherein the electronic device 801, 802 is configured to detect at least a first attribute of at least a first object 5a, 5b, 5c, 5d within a predetermined distance from the vehicle 1; and receive, from the electronic device 801, 802, a temperature control data message, indicative of an instruction to activate any of a cooling or a heating of the temperature controlled vehicle compartment 30a, 30b. According to some embodiments the electronic device 801, 802 is configured to obtain least a first attribute of at least a first object 5a, 5b, 5c, 5d by processing purchase information obtained by the electronic device 801, 802. According to an aspect the electronic device 801 is a smartphone that is used for scanning and/or paying of e.g. groceries at a grocery store, and the electronic device 801 is configured to detect at least a first attribute of at least a first object 5a, 5b, 5c, 5d that is purchased at the grocery store and send a temperature control data message, indicative of an instruction to activate any of a cooling or a heating of the temperature controlled vehicle compartment 30a, 30b, to the system 100 from the electronic device 801. According to some embodiments the electronic device 802 is a server configured to process image and/or data information obtained by a vehicle occupant associated with the system 100, and configured to detect at least a first attribute of at least a first object 5a, 5b, 5c, 5d when processing the image and/or data information. According to some embodiments the image and/or data information is associated with a geographical location of the at least a first object 5a, 5b, 5c, 5d, and the system is configured to determine if the at least a first object 5a, 5b, 5c, 5d is within a predetermined distance from the vehicle 1. According to some embodiments the image and/or data information is timestamped for determining the relevance of the image and/or data information obtained by a vehicle occupant associated with the system 100.

According to an aspect there is provided an electronic device 801, 802 configured to control the temperature of a temperature controlled vehicle compartment 30a, 30b, of the system 100, the electronic device 801, 802 is configured to send a temperature control data message, indicative of an instruction to activate any of a cooling or a heating of the temperature controlled vehicle compartment 30a, 30b, to the system 100 from the electronic device 801, 802.

An advantage with the mentioned embodiments is that the system 100 can get notified of a temperature control data message, that is generated by an electronic device 801, 802 associated with the system 100 within a predetermined distance from the vehicle 1, e.g. in the possession of a vehicle occupant that is away from the vehicle 1, in order to activate cooling or a heating of the temperature controlled vehicle compartment 30a, 30b dependent on the temperature control data message.

According to some embodiments the system 100 further comprises at least a first temperature sensor 10a, 10b operatively connected to the processing circuitry 102a, 102b, 102c configured to obtain temperature data, and the processing circuitry 102a, 102b, 102c is further configured to cause the system 100 to obtain, by the at least first temperature sensor 10a, 10b a first temperature data td1 of the temperature controlled vehicle compartment 30a, 30b while the temperature controlled vehicle compartment 30a, 30b remains closed; obtain, by the at least first temperature sensor 10a, 10b a second temperature data td2 of the temperature controlled vehicle compartment 30a, 30b at a predefined time after the temperature controlled vehicle compartment 30a, 30b has been opened and closed; and determine a change in temperature of the temperature controlled vehicle compartment 30a, 30b based on a temperature difference between the first temperature data td1 and the second temperature data td2; and in a determination that the temperature of the temperature controlled vehicle compartment 30a, 30b is decreasing, activate cooling of the temperature controlled vehicle compartment 30a, 30b; and; in a determination that the temperature of the temperature controlled vehicle compartment 30a, 30b is increasing, activate heating of the temperature controlled vehicle compartment 30a, 30b.

Figure 2B:
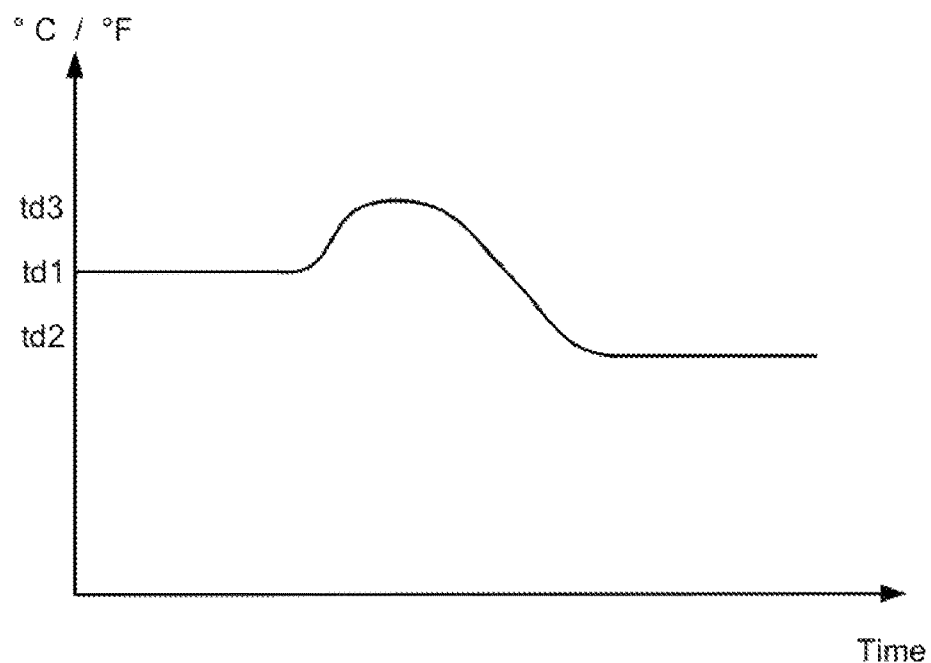
FIG. 2B illustrates temperature data over time according to some embodiments.
Figure 3:
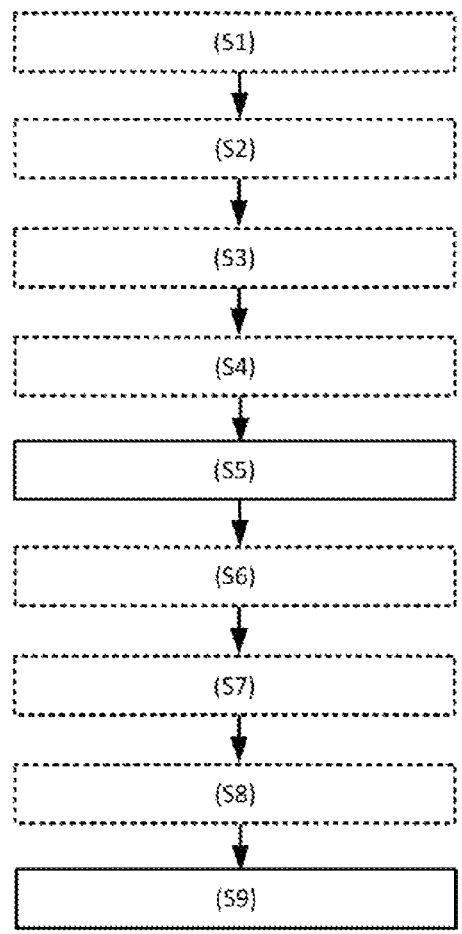
FIG. 3 illustrates a flow chart of the method steps according to the second aspect of the disclosure.
Figure 4:
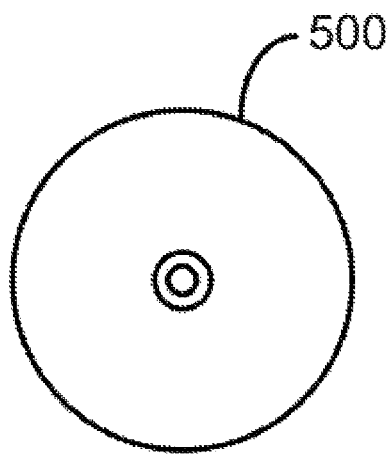
FIG. 4 illustrates a computer program product according to the third aspect of the disclosure.

FIG. 2B illustrates temperature data over time according to some embodiments. In an example the temperature controlled vehicle compartment 30a as illustrated in FIG. 1 is closed and the temperature sensor 10a obtains a first temperature data td1 of the temperature controlled vehicle compartment 30a, e.g. 18 degrees Celsius. At a certain moment the temperature controlled vehicle compartment 30a is opened, and an object e.g. the grocery bag 5 a is placed inside of the temperature controlled vehicle compartment 30a. In the example it is a summer day, and the temperature outside of the temperature controlled vehicle compartment 30a is above 18 degrees Celsius. For a period of time after closing the temperature controlled vehicle compartment 30a, the temperature of the temperature controlled vehicle compartment 30a is higher than 18 degrees Celsius, however after some further time the temperature of the temperature controlled vehicle compartment 30a is below 18 degrees Celsius, and it is determined that the temperature of the temperature controlled vehicle compartment 30a is decreasing, and this in turn activates cooling of the temperature controlled vehicle compartment 30a.

An advantage with the mentioned embodiments is that the temperature controlled vehicle compartment can be cooled or heated dependent on the temperature change after an object has been placed in the temperature controlled vehicle compartment.

According to some embodiments, the system further comprises an external temperature sensor 11a, 11b operatively connected to the processing circuitry configured to obtain temperature data of the exterior temperature outside of the temperature controlled vehicle compartment, and the processing circuitry is further configured to cause the system to obtain, by the external temperature sensor 11a, 11b, a third temperature data td3 of the exterior temperature outside of the temperature controlled vehicle compartment; determine a change in temperature of the temperature controlled vehicle compartment based on the temperature difference between the first temperature data td1 and the second temperature data td2; and in a determination that the temperature of the temperature controlled vehicle compartment is decreasing after a predetermined time, wherein the predetermined time is dependent on the difference between the first temperature data td1 and the third temperature data td3, activate cooling of the temperature controlled vehicle compartment; and in a determination that the temperature of the temperature controlled vehicle compartment is increasing after a predetermined time, wherein the predetermined time is dependent on the difference between the first temperature data td1 and the third temperature data td3, activate heating of the temperature controlled vehicle compartment.

According to some embodiments, the third temperature data td3 is used for setting the predetermined time before determining the change in temperature of the temperature controlled vehicle compartment 30a, 30b. According to some embodiments if the temperature difference between the first temperature data td1 and the third temperature data td3 is increasing, then the predetermined time is increasing. According to some embodiments if the temperature difference between the first temperature data td1 and the third temperature data td3 is decreasing, then the predetermined time is decreasing.

An advantage with the mentioned embodiments is that the temperature controlled vehicle compartment can be cooled or heated further dependent on the surrounding temperature, in which the temperature controlled vehicle compartment has been opened and closed, and on the temperature change after an object has been placed in the temperature controlled vehicle compartment.

According to some embodiments, the at least first object 5a, 5b, 5c, 5d is any of: a food product; a trademark; a package; a container; a grocery store; a shape; a restaurant; a shop; a grocery bag; a cooling box; a food box or a perishable food product. According to some embodiments, the at least first object 5a, 5b, 5c, 5d is associated with a certain temperature. In an example when the at least first object 5a, 5b, 5c, 5d is a trademark, the trademark may be associated with frozen products, such as an ice cream trademark. In another example when the at least first object 5a, 5b, 5c, 5d is a restaurant, the restaurant name may be associated with warm products. In another example when the at least first object 5a, 5b, 5c, 5d is a grocery store, the grocery store may be associated with cold products.

An advantage with the mentioned embodiments is that the object can be of different types since it is the at least first attribute of the object that is used for activating any of cooling or heating of the temperature controlled vehicle compartment.

The second aspect of this disclosure shows a method for controlling the temperature of a temperature controlled vehicle compartment 30a, 30b based on detection of at least a first attribute of at least a first object 5a, 5b, 5c, 5d within a predetermined distance from the vehicle 1, the method comprising: the step S5 detecting at least a first attribute of at least a first object 5a, 5b, 5c, 5d within a predetermined distance from the vehicle 1; and the step S9 activate any of cooling or heating of the temperature controlled vehicle compartment 30a, 30b based on the at least first attribute of the at least first object 5a, 5b, 5c, 5d.

This aspect has an advantage that cooling or heating of the temperature controlled vehicle compartment can be activated dependent on an attribute of an object that is within a distance from the vehicle, and else not activated in order to lower the energy consumption of the vehicle. Another advantage is that e.g. a vehicle occupant does not need to remember to activate the heating or the cooling of the temperature controlled vehicle compartment.

According to some embodiments the method further comprises: the step S1 obtaining, by at least a first camera 20a, 20b, 20c, 20d, at least a first image data im1, im2, im3 of the interior of the temperature controlled vehicle compartment 30a, 30b and/or the surroundings of the vehicle 1; the step S2 detecting at least a first attribute of at least a first object 5a, 5b, 5c, 5d in the at least first image data im1, im2, im3 by object recognition processing of the at least first image data im1, im2, im3; and S6 determining if cooling or heating of the temperature controlled vehicle compartment 30a, 30b is to be activated based on the at least first attribute of the at least first object 5a, 5b, 5c, 5d.

An advantage with the mentioned embodiments is that the camera can be used to identify the object inside the temperature controlled vehicle compartment or outside of the vehicle, and automatically determine if the temperature controlled vehicle compartment is to be cooled or heated dependent on an attribute of the object as such.

According to some embodiments the method further comprises: the step S3 obtaining, by a position sensor 40, a location data associated with the geographical location of the vehicle 1; and the step S4 determining, based on the location data and based on predetermined location information data, that the vehicle 1 is within a predetermined distance from a geographical location that is associated with at least a first object 5a, 5b, 5c, 5d with at least a first attribute.

An advantage with the mentioned embodiments is that the position sensor can be used to identify the geographical location of the vehicle, and the system can determine if the temperature controlled vehicle compartment is to be cooled or heated dependent on the geographical location of the vehicle in relation to the object.

According to some embodiments in a determination that the at least first attribute of the at least first object 5a, 5b, 5c, 5d is associated with a first temperature interval Tint1, activate cooling of the temperature controlled vehicle compartment 30a, 30b; and in a determination that the at least first attribute of the at least first object 5a, 5b, 5c, 5d is associated with a second temperature interval Tint2, activate heating of the temperature controlled vehicle compartment 30a, 30b.

An advantage with the mentioned embodiments is that an attribute of the object itself is used for determining if the temperature controlled vehicle compartment is to be heated or cooled.

According to some embodiments the method further comprises: the step S7 sending a temperature control data request message, indicative of a request to activate any of a cooling or a heating of the temperature controlled vehicle compartment 30a, 30b, to be received at an electronic device; and the step S8 receive a temperature control data response message, indicative of a response to activate any of a cooling or a heating of the temperature controlled vehicle compartment 30a, 30b, from the electronic device.

An advantage with the mentioned embodiments is that e.g. a vehicle occupant that is away from the vehicle can get notified about a request to start heating or cooling of the temperature controlled vehicle compartment, and the vehicle occupant can then remotely acknowledge to start heating or cooling of the temperature controlled vehicle compartment from the electronic device.

According to some embodiments the method further comprises: obtaining, by at least a first temperature sensor 10a, 10b a first temperature data td1 of the temperature controlled vehicle compartment 30a, 30b while the temperature controlled vehicle compartment 30a, 30b remains closed; obtaining, by the at least first temperature sensor 10a, 10b a second temperature data td2 of the temperature controlled vehicle compartment 30a, 30b at a predefined time after the temperature controlled vehicle compartment 30a, 30b has been opened and closed; and determining a change in temperature of the temperature controlled vehicle compartment 30a, 30b based on a temperature difference between the first temperature data td1 and the second temperature data td2; and in a determination that the temperature of the temperature controlled vehicle compartment 30a, 30b is decreasing, activate cooling of the temperature controlled vehicle compartment 30a, 30b; and; in a determination that the temperature of the temperature controlled vehicle compartment 30a, 30b is increasing, activate heating of the temperature controlled vehicle compartment 30a, 30b.

An advantage with the mentioned embodiments is that the temperature controlled vehicle compartment can be cooled or heated dependent on the temperature change after an object has been placed in the temperature controlled vehicle compartment.

According to some embodiments, the at least first object 5a, 5b, 5c, 5d is any of: a food product; a trademark; a package; a container; a grocery store; a shape; a restaurant; a shop; a grocery bag; a cooling box; a food box or a perishable food product.

An advantage with the mentioned embodiments is that the object can be of different types since it is the at least first attribute of the object that is used for activating any of cooling or heating of the temperature controlled vehicle compartment.

The third aspect of this disclosure shows a computer program product the second aspect comprising a non-transitory computer readable medium, having thereon a computer program comprising program instructions, the computer program being loadable into a processing circuitry 102a, 102b, 102c and configured to cause execution of the method when the computer program is run by the at least one processing circuitry 102a, 102b, 102c.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

What is claimed is:

1. A system in a vehicle configured to control the temperature of a temperature controlled vehicle compartment, the system comprising:
   a temperature controlled vehicle compartment configured to be cooled and/or heated, wherein the temperature controlled vehicle compartment is a closed compartment arranged with a covering element configured to be in an open position for receiving at least a first object, and configured to be in a closed position for maintaining the temperature of the at least first object in the temperature controlled vehicle compartment; and
   a processing circuitry operatively connected to the temperature controlled vehicle compartment, configured to cause the system to:
   detect at least a first attribute of the at least first object before the at least first object enters the temperature controlled vehicle compartment and is within a predetermined distance from the vehicle, and
   before the at least first object enters the temperature controlled vehicle compartment, activate a cooling or heating function of the temperature controlled vehicle compartment based on the at least first attribute of the at least first object for maintaining the temperature of the at least first object in the temperature controlled vehicle compartment.

2. The system according to claim 1, wherein the system further comprises at least a first camera operatively connected to the processing circuitry configured to obtain images, and the processing circuitry is further configured to, cause the system to:
   obtain, by the at least first camera, at least a first image data of the interior of the temperature controlled vehicle compartment and/or the surroundings of the vehicle;
   detect at least the first attribute of at least the first object in the at least first image data by object recognition processing of the at least first image data; and
   determine if cooling or heating of the temperature controlled vehicle compartment is to be activated based on the at least first attribute of the at least first object.

3. The system according to claim 1, wherein the system further comprising a position sensor operatively connected to the processing circuitry configured to determine the geographical location of the vehicle, and the processing circuitry is further configured to, cause the system to:
   obtain, by the position sensor, a location data associated with the geographical location of the vehicle; and
   determine, based on the location data and based on predetermined location information data that the vehicle is within a predetermined distance from a geographical location that is associated with at least the first object with at least the first attribute.

4. The system according to claim 1, wherein the processing circuitry is further configured to cause the system to determine when cooling or heating of the temperature controlled vehicle compartment is to be activated based on the at least first attribute of the at least first object and in a determination that the at least first attribute of the at least first object is associated with a first temperature interval, activate cooling of the temperature controlled vehicle compartment; and
   in a determination that the at least first attribute of the at least first object is associated with a second temperature interval, activate heating of the temperature controlled vehicle compartment.

5. The system according to claim 1, wherein the system further comprising a communication module operatively connected to the processing circuitry configured to communicate wirelessly via a communication network, and the processing circuitry is further configured to, cause the system to:
   send a temperature control data request message, indicative of a request to activate any of a cooling or a heating of the temperature controlled vehicle compartment, to be received at an electronic device; and
   receive a temperature control data response message, indicative of a response to activate any of a cooling or a heating of the temperature controlled vehicle compartment, from the electronic device.

6. The system according to claim 1, wherein the system further comprises at least a first temperature sensor operatively connected to the processing circuitry configured to obtain temperature data, and the processing circuitry is further configured to cause the system to
   obtain, by the at least first temperature sensor, a first temperature data of the temperature controlled vehicle compartment while the temperature controlled vehicle compartment remains closed;
   obtain, by the at least first temperature sensor, a second temperature data of the temperature controlled vehicle compartment at a predefined time after the temperature controlled vehicle compartment has been opened and closed; and
   determine a change in temperature of the temperature controlled vehicle compartment based on a temperature difference between the first temperature data and the second temperature data; and
   in a determination that the temperature of the temperature controlled vehicle compartment is decreasing, activate cooling of the temperature controlled vehicle compartment; and
   in a determination that the temperature of the temperature controlled vehicle compartment is increasing, activate heating of the temperature controlled vehicle compartment.

7. The system according to claim 1, wherein the at least first object is any of: a food product; a trademark; a package; a container; a grocery store; a shape; a restaurant; a shop; a grocery bag; a cooling box; a food box; or a perishable food product.

8. A method for controlling the temperature of a temperature controlled vehicle compartment based on detection of at least a first attribute of at least a first object within a predetermined distance from the vehicle, the method comprising:
   detecting at least a first attribute of at least a first object before the at least first object enters the temperature controlled vehicle compartment and is within a predetermined distance from the vehicle; and
   before the at least first object enters the temperature controlled vehicle compartment, activating a cooling or heating function of the temperature controlled vehicle compartment based on the at least first attribute of the at least first object for maintaining the temperature of the at least first object in the temperature controlled vehicle compartment.

9. The method according to claim 8, the method further comprising:
obtaining, by at least a first camera, at least a first image data of the interior of the temperature controlled vehicle compartment and/or the surroundings of the vehicle;
detecting at least a first attribute of at least the first object in the at least first image data by object recognition processing of the at least first image data; and
determining if cooling or heating of the temperature controlled vehicle compartment is to be activated based on the at least first attribute of the at least first object.

10. The method according to claim 9, wherein
in a determination that the at least first attribute of the at least first object is associated with a first temperature interval, activate cooling of the temperature controlled vehicle compartment; and
in a determination that the at least first attribute of the at least first object is associated with a second temperature interval, activate heating of the temperature controlled vehicle compartment.

11. The method according to claim 8, the method further comprising:
obtaining, by a position sensor, a location data associated with the geographical location of the vehicle; and
determining, based on the location data and based on predetermined location information data, that the vehicle is within a predetermined distance from a geographical location that is associated with at least the first object with at least the first attribute.

12. The method according to claim 8, the method further comprising:
sending a temperature control data request message, indicative of a request to activate any of a cooling or a heating of the temperature controlled vehicle compartment, to be received at an electronic device; and
receiving a temperature control data response message, indicative of a response to activate any of a cooling or a heating of the temperature controlled vehicle compartment, from the electronic device.

13. The method according to claim 8, the method further comprising:
obtaining, by at least a first temperature sensor, a first temperature data of the temperature controlled vehicle compartment while the temperature controlled vehicle compartment remains closed;
obtaining, by the at least first temperature sensor, a second temperature data of the temperature controlled vehicle compartment at a predefined time after the temperature controlled vehicle compartment has been opened and closed; and
determining a change in temperature of the temperature controlled vehicle compartment based on a temperature difference between the first temperature data and the second temperature data; and
in a determination that the temperature of the temperature controlled vehicle compartment is decreasing, activate cooling of the temperature controlled vehicle compartment; and
in a determination that the temperature of the temperature controlled vehicle compartment is increasing, activate heating of the temperature controlled vehicle compartment.

14. The method according to claim 8, wherein the at least first object is any of: a food product; a trademark; a package; a container; a grocery store; a shape; a restaurant; a shop; a grocery bag; a cooling box; a food box; or a perishable food product.

15. A non-transitory computer readable medium having stored thereon a computer program comprising program instructions, the computer program being loadable into a processing circuitry and configured to cause execution of the method according to claim 8 when the computer program is run by the at least one processing circuitry.

* * * * *